United States Patent
Pillilli et al.

(10) Patent No.: US 12,164,907 B2
(45) Date of Patent: Dec. 10, 2024

(54) FIRMWARE UPDATE TECHNOLOGIES

(71) Applicant: Intel Corporation, Santa Clara, CA (US)

(72) Inventors: Bharat S. Pillilli, El Dorado Hills, CA (US); Johan Van De Groenendaal, Portland, OR (US)

(73) Assignee: Intel Corporation, Santa Clara, CA (US)

(*) Notice: Subject to any disclaimer, the term of this patent is extended or adjusted under 35 U.S.C. 154(b) by 678 days.

(21) Appl. No.: 17/133,462

(22) Filed: Dec. 23, 2020

(65) Prior Publication Data
US 2021/0224061 A1 Jul. 22, 2021

(51) Int. Cl.
G06F 9/44 (2018.01)
G06F 8/656 (2018.01)
G06F 21/57 (2013.01)

(52) U.S. Cl.
CPC ............ G06F 8/656 (2018.02); G06F 21/572 (2013.01); *G06F 2221/033* (2013.01)

(58) Field of Classification Search
CPC .................................................. G06F 8/656
USPC ......................................................... 717/172
See application file for complete search history.

(56) References Cited

U.S. PATENT DOCUMENTS 6,581,159 B1 6/2003 Nevis et al.
9,015,455 B2* 4/2015 Held .................... G06F 21/575
713/1
2019/0065172 A1 2/2019 Nachimuthu et al.
2022/0027138 A1* 1/2022 Stevens ................. G06F 21/572
2022/0138324 A1* 5/2022 Lee ....................... H04L 9/0877
726/22

FOREIGN PATENT DOCUMENTS

CN 107943508 A * 4/2018 ............. G06F 21/57
JP H117382 A 1/1999

OTHER PUBLICATIONS

Cision PR Newswire, "OCP Announces V1.0 of Security Requirements Documents, improving security and trust for future OCP servers with hardware root-of-trust" OPEN Compute Project Foundation, https://www.prnewswire.com/news-releases/ocp-announces-v1-0-of-security-requirements-documents-improving-security-and-trust-for-future-ocp-servers-with-hardware-root-of-trust-301169974.html, Nov. 1, 2020, 4 pages.

Frazelle, Jessie, "Opening up the Baseboard Management Controller", Commit to Memory, acmqueue, Sep.-Oct. 2019, 8 pages.

Regenscheid, Andrew, "Toots of Trust in Mobile Devices", iTL, NIST, ISPAB, Feb. 2012, 5 pages.

(Continued)

*Primary Examiner* — Evral E Bodden
(74) *Attorney, Agent, or Firm* — Compass IP Law PC

(57) ABSTRACT

Examples described herein a firmware update device to execute a second firmware, in place of execution of a first firmware, in response to an instruction that causes the firmware update device to execute the second firmware, wherein the second firmware is copied to a buffer prior to execution of the instruction. In some examples, one or more processors are to execute the instruction that causes the firmware update device to execute the second firmware. In some examples, prior to execution of the instruction, a device root of trust is also to validate the second firmware.

20 Claims, 6 Drawing Sheets

(56) References Cited

OTHER PUBLICATIONS

Zimmer, Vincent, "Establishing the Root of Trust", uefi, Aug. 2016, 5 pages.
Extended European Search Report for Patent Application No. 21210857.5, Mailed May 10, 2022, 8 pages.
European First Office Action, (EP Exam Report Article 94(3) EPC), for Patent Application No. 21210857.5, Mailed May 23, 2023, 5 pages.
European Second Office Action, (EP Exam Report Article 94(3) EPC), for Patent Application No. 21210857.5, Mailed Jan. 8, 2024, 5 pages.
European Third Office Action, (EP Exam Report Article 94(3) EPC), for Patent Application No. 21210857.5, Mailed Jul. 3, 2024, 4 pages.

\* cited by examiner

FIRMWARE UPDATE TECHNOLOGIES

Computing devices utilize firmware for hardware initialization, low-level hardware management, and managing a boot process. In addition to the platform firmware, computing devices may also include dedicated firmware for controller chips, peripheral devices, or other components. Firmware is typically read at runtime and in connection with a boot, but may be updated in connection with a specialized firmware update process.

Run-time firmware patches can be deployed for various central processing unit (CPU) firmware engines to fix bugs (errors), introduce newer capabilities, or revert to a prior firmware version. While some of the firmware patches require system reset, some patches can be performed runtime without causing reset of a CPU and its platform along with its components (e.g., network interface, memory, storage, other peripheral devices).

A manner of delivering run-time CPU firmware patches is by execution of Write to Model Specific Register (WRMSR) to MSR 0x79 instruction. For Advanced Micro Devices, Inc. (AMD), CPU firmware patches can be delivered to MSR 0xc0010020. When this instruction is operating, system is implicitly in a stalled mode. The OS controls what firmware images are deployed to a CPU. This patch delivery mechanism is intrusive to the up-time of the operating system (OS) workloads. With ever increasing amount of CPU firmware and multiple dielets, chiplets or clusters within a system on chip (SOC), using this methodology can introduce unacceptably long system stall times. Where multitudes of systems in a data center receive firmware patches, a length of time taken for the firmware patch can be very large. This stall time is viewed as blackout time from a customer view. Stalling the OS from functioning can lead to timeout or quality of service (QoS) issues from a customer point of view.

The OS controlling what firmware images are deployed to a CPU can be a security threat if the OS is not trusted. In bare metal operating environments, a customer (CSP) chooses an OS to run but the OS may select to run the wrong firmware and the customer's customer (tenant) can be impacted by such faulty firmware choice.

DETAILED DESCRIPTION

Various embodiments provide a platform root of trust (PRoT) which determines which firmware a device should or should not run during runtime or on re-boot. Various embodiments attempt to reduce stall time during a firmware update by making the device firmware patching (e.g., updates, additions, changes, or overwrites). For example, a firmware patch can include a firmware update, configuration table change (e.g., rules for received transactions), access control list (ACL) update, or others. Various embodiments provide a platform root of trust (PRoT) updating firmware with a firmware image by writing the firmware image to a staging buffer (e.g., flash memory region or an internal memory). The PRoT can perform vendor specific authentication of the firmware image. A security controller of a device (e.g., CPU, GPU, network interface, accelerator, xPU) can fetch the firmware image from the staging buffer, authenticate the firmware image, and, if authenticated, deliver the firmware image to any device that is to receive a firmware patch. In some examples, an OS can be informed to change states of one or more cores or devices to a lower power state (e.g., C-state, Cx state, P-state, G1, G2, Px state, sleep, deep sleep) to allow for microcode or host agent based patching.

Various embodiments provide for patch deployment to devices at run-time or re-boot that are vendor authenticated, approved and measured by the PRoT. In various embodiments, the measurement can include a cryptographic measurement such as a hash of one or more images (e.g., firmware) by one or more controllers. Various embodiments provide patch fetch, verification, anti-rollback, authentication, decryption, decompression, and delivery to the destination devices that occurs prior to a request for firmware installation from the staging buffer. In some examples, an OS executes a command that causes a write to a particular register that causes a device to load firmware from a staging buffer and the device can execute the loaded firmware during runtime or at re-boot. In some examples, the particular register is not 0x79 or 0xc0010020, but a different register.

In some examples, firmware installation may stall operation of an OS for a time to install firmware from the staging buffer as opposed to also stalling operation of the OS during one or more of: patch fetch, verification, anti-rollback, authentication, decryption, decompression, and delivery to the destination devices. A destination device switching to an updated firmware image may or may not be managed by an OS or other components in the device because the destination device (e.g., firmware loader) can accept a firmware patch at a staging buffer at an opportune time based on the current services running. Various embodiments can be applied to roll-back of firmware to a prior version.

Figure 1:
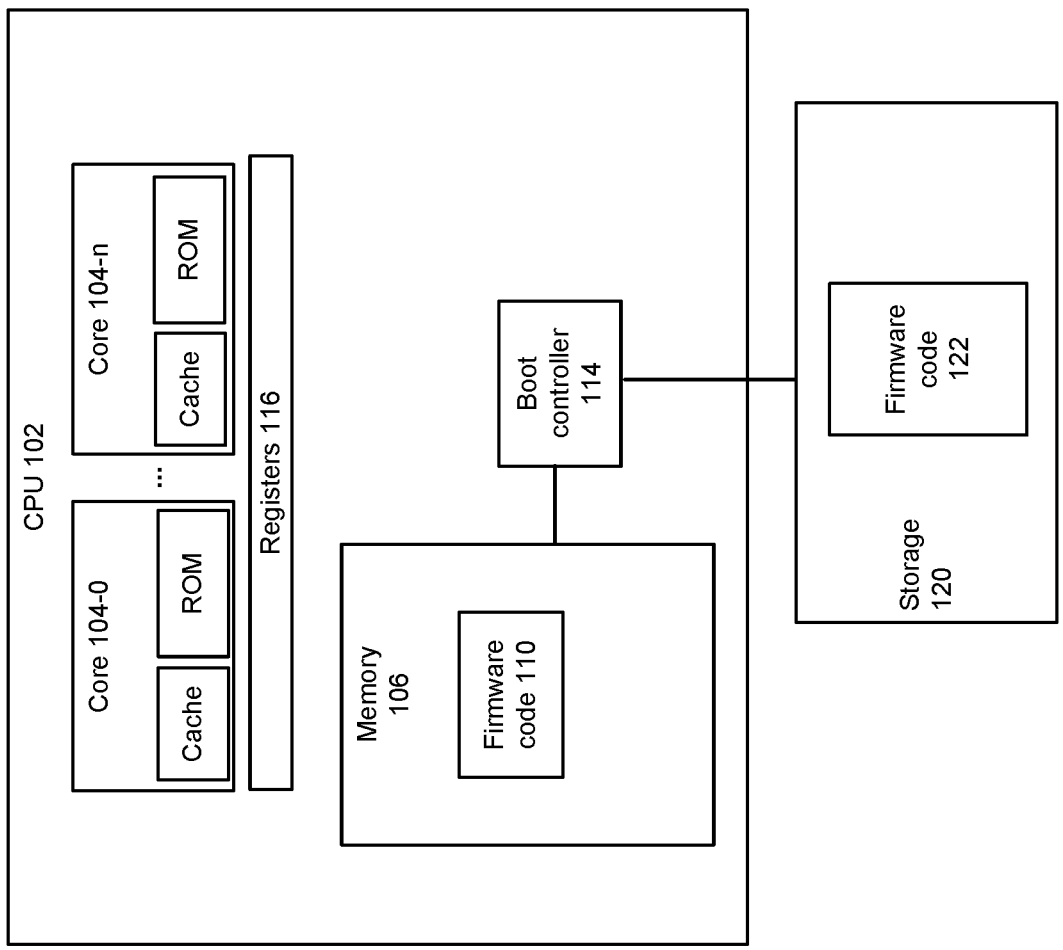
FIG. 1 depicts an example system.

FIG. 1 depicts an example system. Central processing unit (CPU) 102 can include cores 104-0 to 104-n. A core can be an execution core or computational engine that is capable of executing instructions. A core can have access to its own cache and read only memory (ROM), or multiple cores can share a cache or ROM. Cores can be homogeneous and/or heterogeneous devices. Any type of inter-processor communication techniques can be used, such as but not limited to messaging, inter-processor interrupts (IPI), inter-processor communications, and so forth. Cores can be connected in any type of manner, such as but not limited to, bus, ring, or mesh. A core may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction (s) described herein. In addition or alternative to use of a CPU, an XPU or xPU could be used. An XPU can include one or more of: a graphics processing unit (GPU), general purpose GPU (GPGPU), field programmable gate arrays (FPGA), Accelerated Processing Unit (APU), accelerator or other processor.

In some embodiments, a microcontroller or processor-executed OS (not shown) can perform a command to write to a particular processor or core register among registers 116, which causes boot controller 114 to load firmware from a staging buffer and the device can execute the loaded firmware during runtime. In some examples, the particular register is not 0x79 or 0xc0010020, but a different register. In some examples, firmware installation may stall operation of an OS for a time to install firmware from the staging buffer as opposed to also stalling operation of the OS during one or more of: patch fetch, verification, anti-rollback, authentication, decryption, decompression, and delivery to the destination devices.

CPU 102 can cause boot controller 114 to access firmware code 122 from storage 120 and copy the firmware code 110 to memory 106. Boot firmware code or firmware can have a header file that identifies a map of what boot code is to be copied by CPU 102. For example, a .h file for a firmware code can have a flash image layout map of which segments of the firmware code are to be copied. When executed by a processor, firmware code can be executed by a processor to perform hardware initialization during a booting process (e.g., power-on startup), and provide runtime services for operating systems and programs.

In some embodiments, boot firmware code or firmware can be one or more of: Basic Input/Output System (BIOS), Universal Extensible Firmware Interface (UEFI), or a boot loader. The BIOS firmware can be pre-installed on a personal computer's system board or accessible through an SPI interface from a boot storage (e.g., flash memory). In some examples, firmware code can be stored on a device and accessible from the device by one or more cores or CPUs using an interface such as Serial Peripheral Interface (SPI), enhanced SPI (eSPI), System Management Bus (SMBus), I2C, MIPI I3C®, or other interface (e.g., PCIe or CXL). A firmware can initialize and test the system hardware components and loads a boot loader from a memory device which initializes and executes an operating system. The OS, in some examples can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others.

In some examples, a Universal Extensible Firmware Interface (UEFI) can be used instead or in addition to a BIOS for booting or restarting cores or processors. UEFI is a specification that defines a software interface between an operating system and platform firmware. UEFI can read from entries from disk partitions by not just booting from a disk or storage but booting from a specific boot loader in a specific location on a specific disk or storage. UEFI can support remote diagnostics and repair of computers, even with no operating system installed. A boot loader can be written for UEFI and can be instructions that a boot code firmware can execute and the boot loader is to boot the operating system(s). A UEFI bootloader can be a bootloader capable of reading from a UEFI type firmware.

A UEFI capsule is an industry standard way of encapsulating a binary image for firmware code updates. But in some embodiments, the UEFI capsule is used to update a runtime component of the firmware code. The UEFI capsule can include updatable binary images with relocatable Portable Executable (PE) file format for executable or dynamic linked library (dll) files based on COFF (Common Object File Format). For example, the UEFI capsule can include executable (*.exe) files. This UEFI capsule can be deployed to a target platform as an SMM image via existing OS specific techniques (e.g., Windows Update for Azure, or LVFS for Linux).

Boot controller 114 can be any type of controller (e.g., microcontroller) capable of managing firmware code loading and storage into memory 106. In some examples, boot controller 114 can be coupled to storage 120 using one or more of the following protocols: serial peripheral interface (SPI), enhanced SPI (eSPI), PCIe, or other interface. In some examples, storage 120 can be connected to boot controller 114 using a fabric or network and transmitted using a packet. As described herein, firmware code 122 may have been authenticated by a platform root of trust prior to distribution to CPU 102 and potentially other devices. In accordance with some embodiments, an OS or other device may perform firmware installation from a staging buffer (e.g., memory 106) as opposed to also stalling operation of the OS during one or more of: patch fetch, verification, anti-rollback, authentication, decryption, decompression, and delivery to the destination devices.

Firmware or other software update of any device in any computing platform can take place and a device can include one or more of: network interface controller, XPU, infrastructure processing unit (IPU), Board Management Controller (BMC), CPU, CPU socket, storage controller, memory controller, display engine, graphics processing unit (GPU), accelerator device, or any peripheral device. Firmware or other software update can occur of any device that is connected to a platform using PCIe or CXL. See, for example, Peripheral Component Interconnect Express (PCIe) Base Specification 1.0 (2002), as well as earlier versions, later versions, and variations thereof. See, for example, Compute Express Link (CXL) Specification revision 2.0, version 0.7 (2019), as well as earlier versions, later versions, and variations thereof.

In some example, boot controller 114 can be part of a device that restricts loading and execution of firmware that are signed with a platform key. In some examples, boot controller 114 can include any of an Intel® Management or Manageability Engine (ME), AMD® Platform Security Processor (PSP), ARM® core with TrustZone extension, or other secure enclave that restricts reading or writing to a region of memory or storage. A secure enclave or trust domain can be a region of memory or a processor or both that are not accessible by processes except for designated and limited processes, virtual machines, or containers.

Multiple manners of providing a secure enclave to store and access firmware or firmware updates can be used including virtualization, physical partitioning, trust domains, secure enclaves, Intel® SGX, Intel® TDX, AMD Memory Encryption Technology, AMD Secure Memory Encryption (SME) and Secure Encrypted Virtualization (SEV), ARM® TrustZone®, Apple Secure Enclave Processor, or Qualcomm® Trusted Execution Environment. Encryption or decryption can use, for example, total memory encryption (TME) and multi-key total memory encryption (MKTME) commercially available from Intel Corporation (as described in the Intel Architecture Memory Encryption Technologies Specification version 1.1 dated Dec. 17, 2017 and later revisions), components that make up TME and MKTME, the manner in which TME and MKTME operate, and so forth. TME can provide a scheme to encrypt data by memory interfaces whereby a memory controller encrypts the data flowing to the memory or decrypts data flowing from memory and provides plain text for internal consumption by the processor.

In some examples, TME is a technology that encrypts a device's entire memory or portion of a memory with a key. When enabled via basic I/O system (BIOS) (or Universal Extensible Firmware Interface (UEFI), or a boot loader) configuration, TME can provide for memory accessed by a processor on an external memory bus to be encrypted. TME can support a variety of encryption algorithms and in one embodiment may use a National Institute of Standards and Technology (NIST) encryption standard for storage such as the advanced encryption system (AES) XTS algorithm with 128-bit keys. The encryption key used for memory encryption is generated using a hardened random number generator in the processor and is never exposed to software. Data in memory and on the external memory buses can be encrypted and is in plain text while inside the processor circuitry. This allows existing software to run unmodified while protecting memory using TME. There may be scenarios where it would be advantageous to not encrypt a portion of memory, so TME allows the BIOS (or UEFI or bootloader) to specify a physical address range of memory to remain unencrypted. The software running on a TME-capable system has full visibility into all portions of memory that are configured to not be encrypted by TME. This can be accomplished by reading a configuration register in the processor.

In some embodiments, TME can support multiple encryption keys (Multi-Key TME (MKTME)) and provides the ability to specify the use of a specific key for a page of memory. This architecture allows either processor-generated keys or tenant-provided keys, giving full flexibility to customers. VMs and containers can be cryptographically isolated from each other in memory with separate encryption keys which can be used in multi-tenant cloud environments. VMs and containers can also be pooled to share an individual key, further extending scale and flexibility.

An example enclave/trust domain can be a Trusted Execution Environment (TEE) that is an isolated execution environment that provides security features such as isolated execution (confidentiality), integrity of applications (and guest operating systems) executing with the TEE, along with confidentiality of their assets. TEEs help defend against attacks targeting underlying layers of the stack, including the host operating system, host hypervisor, devices, drivers, and firmware, by providing specialized execution environments known as "enclaves/trust domains".

An example enclave can include a logical collection of entities which belong to the same "trusted" domain with secure communication between entities. There can be multiple enclaves within a pod. An enclave can span across multiple pods. An enclave may include one or more shared memory domains. Entities within an enclave may contain non-shared memory regions. There may be trust relationship between enclaves. An enclave may expose parts of memory to other enclaves.

In some examples, any processor can execute a packet processing process as an application or part of a virtual execution environment. Packet processing process can perform processing of received packets such as one or more of: determination if a packet is valid (e.g., correct Ethernet type, correct checksum, correct IP Protocol type, valid layers 4-7 protocol type), determination of packet destination (e.g., next hop, destination queue), match-action activity, or perform one or more of: IP filter checks, flow table lookup, access control lists (ACL), firewall, match-actions operations, outgoing port selection using a forwarding table, packet decryption, packet encryption, denial of server protection, packet counting, billing, traffic management/conditioning, traffic shaping/traffic scheduling, packet marking/remarking, packet inspection of layers 4-7, or traffic load balancing/load distribution. For example, packet processing process can perform Data Plane Development Kit (DPDK) or OpenDataPlane (ODP) compatible packet processing.

A packet can include a header and payload. A header can be a media access control (MAC) source and destination addresses, Ethertype, Internet Protocol (IP) source and destination addresses, IP protocol, Transmission Control Protocol (TCP) port numbers, virtual local area network (VLAN) or Multi-Protocol Label Switching (MPLS) tags.

A packet processing process can perform packet processing using Network Function Virtualization (NFV), software-defined networking (SDN), virtualized network function (VNF), Evolved Packet Core (EPC), or 5G network slicing. Some example implementations of NFV are described in European Telecommunications Standards Institute (ETSI) specifications or Open Source NFV Management and Orchestration (MANO) from ETSI's Open Source Mano (OSM) group. VNF can include a service chain or sequence of virtualized tasks executed on generic configurable hardware such as firewalls, domain name system (DNS), caching or network address translation (NAT) and can run in virtual execution environments. VNFs can be linked together as a service chain. In some examples, EPC is a 3GPP-specified core architecture at least for Long Term Evolution (LTE) access. 5G network slicing can provide for multiplexing of virtualized and independent logical networks on the same physical network infrastructure.

Various examples of a CPU or IPU can perform an application composed of microservices, where each microservice runs in its own process and communicates using protocols (e.g., an HTTP resource API, message service or gRPC). Microservices can be independently deployed using centralized management of these services. The management system may be written in different programming languages and use different data storage technologies. A microservice can be characterized by one or more of: use of fine-grained interfaces (to independently deployable services), polyglot programming (e.g., code written in multiple languages to capture additional functionality and efficiency not available in a single language), or lightweight container or virtual machine deployment, and decentralized continuous microservice delivery.

Any processor can execute a virtualized execution environment. A virtualized execution environment can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an OS or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux® and Windows® Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. Isolation can include permitted access of a region of addressable memory or storage by a particular container but not another container.

The isolated nature of containers provides several benefits. First, the software in a container will run the same in different environments. For example, a container that includes PHP and MySQL can run identically on both a Linux computer and a Windows® machine. Second, containers provide added security since the software will not affect the host operating system. While an installed application may alter system settings and modify resources, such as the Windows® registry, a container can only modify settings within the container.

Figure 2A:
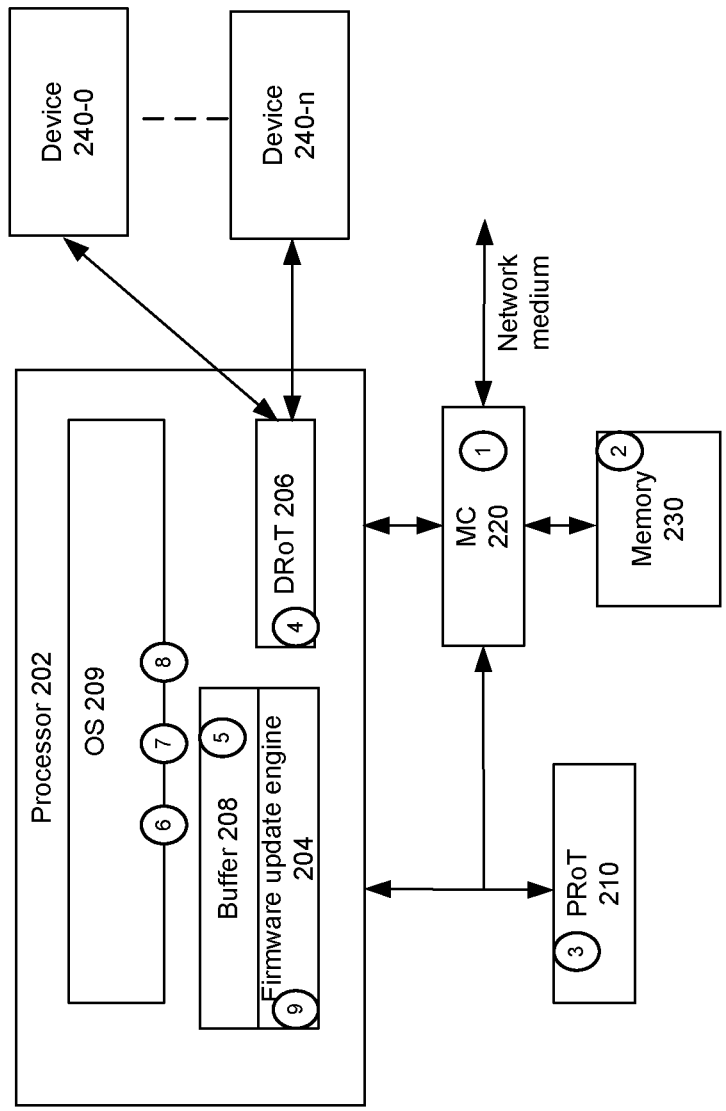
FIGS. 2A and 2B depict example systems.

FIG. 2A depicts an example system. In some examples, processor 202 utilizes a firmware update engine 204 and device root of trust (DRoT) 206 to manage firmware updates. In some examples, processor 202 can include a CPU or xPU. In some examples, DRoT 206 can be consistent with Open Compute Project Foundation (OCP) Active Component RoT (AC RoT).

Examples described with respect to processor 202 to update firmware can apply to any of devices 240-0 to 240-n, where n is an integer. Various examples of devices are described herein, but are not limited thereto. In some examples, processor 202 can be connected to a Management Controller (MC) 220 through an interface and Platform Root of Trust (PRoT) 210 through an interface. Any types of interfaces can be used such as I2C, I3C, eSPI, SPI, SMBus, or others. MC 220 may also be connected to other devices using a network through an Ethernet controller.

In some examples, MC 220 can include a baseboard management controller (BMC). A BMC can perform tasks on behalf of a data center administrator such as power cycling a server, monitoring hardware failures, monitoring device temperature, monitoring cooling fan speeds, monitoring power status, monitoring operating system (OS) status, and so forth. BMC can monitor sensors and can send alerts to a system administrator of any parameter abnormalities (e.g., parameters are not within pre-set limits).

Some examples of updating firmware for processor 202 can include the following. At (1), a firmware patch can be received at MC 220 from a network. A network interface (not depicted) can receive one or more packets and the provide a firmware patch received in the one or more packets to MC 220. At (2), MC 220 can write the patch into flash memory 230. At (3), PRoT 210 can verify the patch by performing network and source verifications. For example, a hash can be performed on the patch to determine if the hash generates an expected value. Verification can include determining if certificate associated with the patch or a calculation matches an expected certificate or value. The certificate can be compatible with X.509 or other standards such as Simple Product Key Infrastructure (SPKI) or Pretty Good Privacy (PGP). An X.509 certificate can include a digital certificate that uses X.509 public key infrastructure (PKI) standard to verify that a public key belongs to a user. If authentication fails (not shown), however, the patch can be rejected and an administrator alerted to take action and identify potentially malicious behavior to access a firmware or to update certificates used for authentication. Verification can include decrypting the patch using a key. For example, elliptic-curve Diffie-Hellman (ECDH) key agreement protocol can be used where parties having an elliptic-curve public-private key pair to establish a shared secret. Other schemes can be used such as Triple Data Encryption Standard (3DES), Advanced Encryption Standard (AES), Digital Signature Algorithm (DSA), Rivest-Shamir-Adleman (RSA) algorithm, Elliptic Curve Digital Signature Algorithm (ECDSA), or others. A watchlist or deny list can be checked to see if the firmware update corresponds to a non-permitted firmware update.

At (4), PRoT 210 can command or request DRoT 206 to copy the patch from memory 230. At (5), DRoT 206 can fetch the patch from memory 230 (e.g., flash memory) and authenticate the patch. Similar techniques to verify the patch can be applied by DRoT 206 as performed by PRoT 210. In some examples, DRoT 206 uses different keys to validate the patch than used by PRoT 210. The keys applied by DRoT 206 can be provided by an owner of the device in some examples. For a valid and authenticated patch, DRoT 206 can cause distribution of the patch to any of: buffer 208 or one or more of devices 240-0 to 240-n. In some examples, PRoT 210 can distribute the verified patch to any of devices 240-0 to 240-n and any of devices 240-0 to 240-n can use utilize a DRoT to validate the patch. If authentication fails (not shown), however, the patch can be rejected by a particular DRoT for a device and an administrator can be notified of patch failure.

At (6), DRoT 206 can inform firmware update engine 204 of a firmware update. In some examples, firmware update engine 204 can include any of: an Intel® Management or Manageability Engine (ME), AMD® Platform Security Processor (PSP), ARM® core with TrustZone extension, or other secure enclave that restricts reading or writing to a region of memory or storage. At (7), firmware update engine 204 can inform OS there is a firmware update available. At (8), the OS can execute an instruction to cause one or more cores to read buffer 208 where the patch is deposited or cause the one or more cores to apply the patch. The one or more cores can be the cores on which the OS executes or other cores. For example, the instruction can include a write to register command (e.g., WRMSR 7F) that can cause a core to copy firmware from buffer 208 (e.g., local SRAM) to a register 7F, although other registers can be used. In some examples, buffer 208 can be accessed by one or multiple cores serially or in parallel. Thereafter, the processor 202 or any of devices 240-0 to 240-n can execute the updated firmware at boot, re-boot, or during runtime.

Example of the instruction can perform a firmware distribution and cause the devices to apply the distributed firmware. The instruction can cause one or more devices to install a firmware update after distribution of a firmware patch to the devices has completed, and informs the devices to apply the updated firmware from a buffer. After the firmware update is installed by the device, the OS can resume operation. In some examples, the instruction does not cause a firmware distribution and wait for firmware installation but rather causes firmware execution from a buffer.

In some examples, buffer 208 is implemented as a ping pong buffer whereby a first firmware can be stored even after a second firmware is loaded into buffer 208. For example, a ping pong buffer can include a second buffer to store the recently added firmware while retaining previously stored and executed firmware. At (9), the firmware update engine 204 can cause use one or more cores to utilize the recently added second firmware instead of the formerly executed firmware.

Note that in some examples, one or more of devices 240-0 to 240-n can perform any of the process of (1)-(9).

Figure 2B:
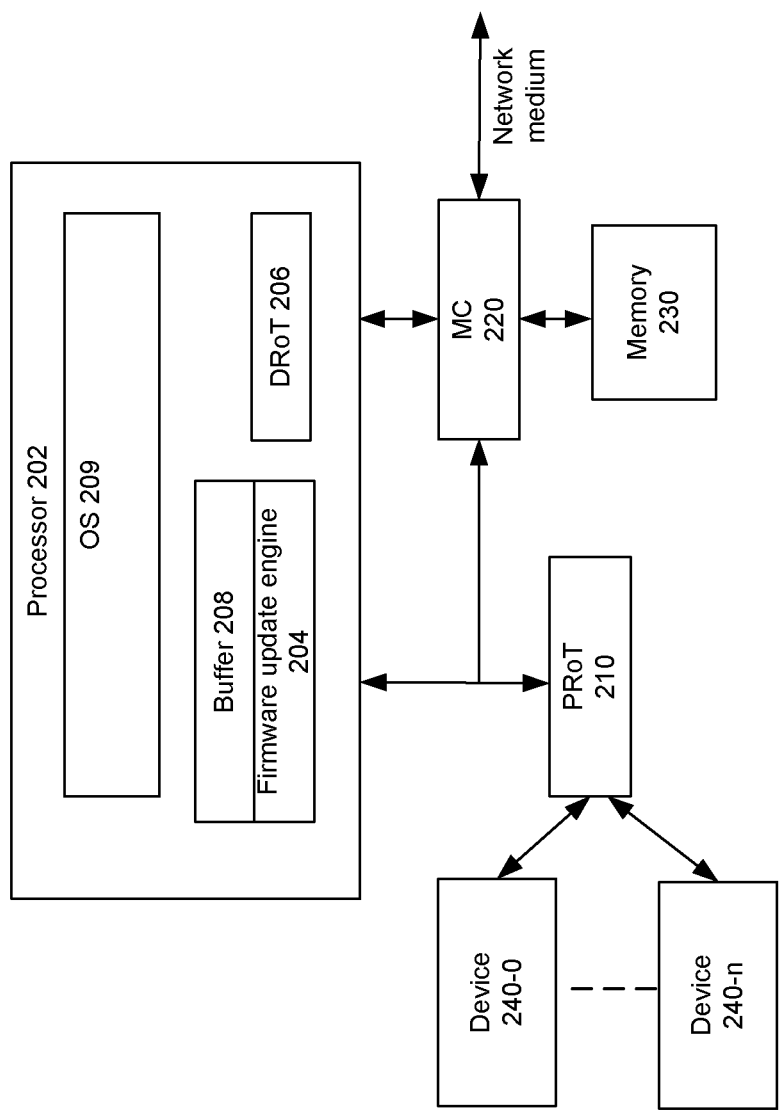

FIG. 2B depicts an example system. In this example, a PRoT 210 can distribute validated firmware updates or patches to any of one or more of devices 240-0 to 240-n. Note that one or more of devices 240-0 to 240-n can perform any of the process of (5)-(9).

Figure 3:
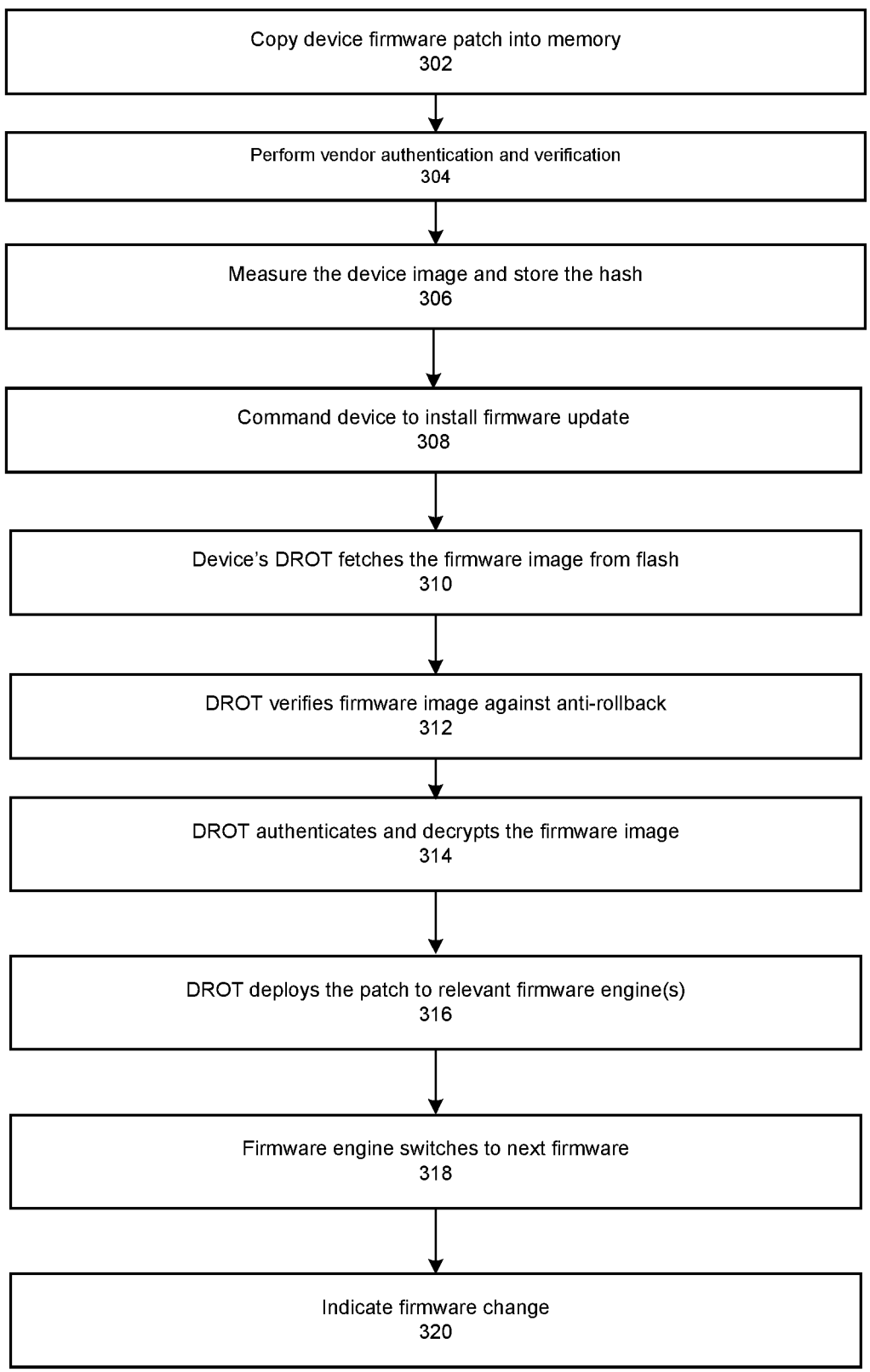
FIG. 3 depicts an example process.

FIG. 3 depicts an example process. The process can be performed after a management controller, PROT and CPU (or device) have established mutual authentication of each other. The process can be performed for any device that is to receive a firmware update by use of an instruction described herein. At 302, a platform memory can be updated with a firmware image through an out-of-band interface or a trusted management controller driver. This image can be copied into a region within one single flash memory that is dedicated for seamless firmware or a redundant flash. In some examples, the flash memory can be integrated into a management controller as on-die with the management controller. A firmware update can occur over eSPI or network (e.g., Ethernet). The management controller can indicate to the PROT a flash update has occurred.

At 304, the PROT can perform authentication of the flash image that is delivered and updated. Various authentication and verification techniques are described herein. At 306, the PROT can measure the device image and store the hash. In various embodiments, the measurement can include a cryptographic measurement such as a hash of one or more images (e.g., firmware) by one or more controllers. At 308, the PROT or management controller can indicate to one or more device's root(s) of trust to fetch the firmware image from the platform flash memory.

At 310, the device root of trust (DROT) can fetch the validated image from the platform. At 312, the DROT can perform anti-rollback checks to prevent downgrading of the device to an older version of its software, which has been not permitted for example, due to security concerns. At 314, the DROT can authenticate and decrypt the image. Various examples of image authentication and decryption are described herein. If 310-314 were successful, at 316, DROT can deploy the patch to the firmware engine that is to be patched or updated. At 318, the patched firmware engine can switch to execution of the recently received firmware image and acknowledge the patch completion to DROT. The firmware engine may also indicate to any dependent device to read its capability vector to identify the feature upgrades or downgrades. At 320, the DROT can indicate to the host or other devices to inform the firmware update has occurred. For example, the firmware update may be an upward revision. The DROT can indicate a firmware update has occurred by issuing an interrupt. This may trigger flows where the security version number (SVN), Revision ID (REVID) etc. of the upgraded image, specific capability vectors are read that may be used as information to run other flows.

Figure 4:
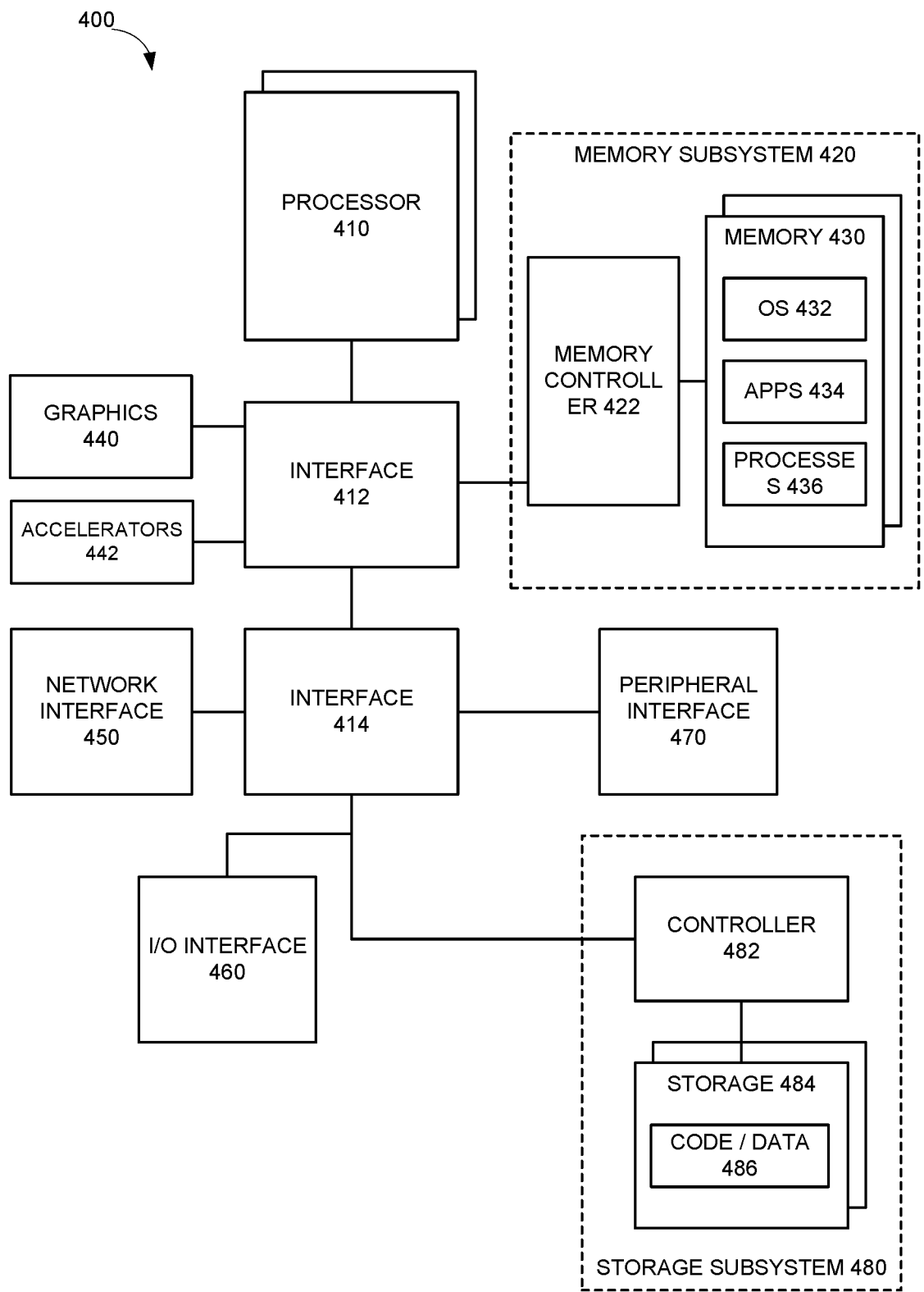
FIG. 4 depicts a system.

FIG. 4 depicts a system. Various embodiments can be used by system 400 to update or access another firmware code. System 400 includes processor 410, which provides processing, operation management, and execution of instructions for system 400. Processor 410 can include any type of microprocessor, central processing unit (CPU), graphics processing unit (GPU), Accelerated Processing Unit (APU), processing core, or other processing hardware to provide processing for system 400, or a combination of processors. Processor 410 controls the overall operation of system 400, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 400 includes interface 412 coupled to processor 410, which can represent a higher speed interface or a high throughput interface for system components that needs higher bandwidth connections, such as memory subsystem 420 or graphics interface 440, or accelerators 442. Interface 412 represents an interface circuit, which can be a standalone component or integrated onto a processor die. Where present, graphics interface 440 interfaces to graphics components for providing a visual display to a user of system 400. In one example, graphics interface 440 can drive a high definition (HD) display that provides an output to a user. High definition can refer to a display having a pixel density of approximately 100 PPI (pixels per inch) or greater and can include formats such as full HD (e.g., 1180$p$), retina displays, 4K (ultra-high definition or UHD), or others. In one example, the display can include a touchscreen display. In one example, graphics interface 440 generates a display based on data stored in memory 430 or based on operations executed by processor 410 or both. In one example, graphics interface 440 generates a display based on data stored in memory 430 or based on operations executed by processor 410 or both.

Accelerators 442 can be a programmable or fixed function offload engine that can be accessed or used by a processor 410. For example, an accelerator among accelerators 442 can provide sequential and speculative decoding operations in a manner described herein, compression (DC) capability, cryptography services such as public key encryption (PKE), cipher, hash/authentication capabilities, decryption, or other capabilities or services. In some embodiments, in addition or alternatively, an accelerator among accelerators 442 provides field select controller capabilities as described herein. In some cases, accelerators 442 can be integrated into a CPU socket (e.g., a connector to a motherboard or circuit board that includes a CPU and provides an electrical interface with the CPU). For example, accelerators 442 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 442 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 420 represents the main memory of system 400 and provides storage for code to be executed by processor 410, or data values to be used in executing a routine. Memory subsystem 420 can include one or more memory devices 430 such as read-only memory (ROM), flash memory, one or more varieties of random access memory (RAM) such as DRAM, or other memory devices, or a combination of such devices. Memory 430 stores and hosts, among other things, operating system (OS) 432 to provide a software platform for execution of instructions in system 400. Additionally, applications 434 can execute on the software platform of OS 432 from memory 430. Applications 434 represent programs that have their own operational logic to perform execution of one or more functions. Processes 436 represent agents or routines that provide auxiliary functions to OS 432 or one or more applications 434 or a combination. OS 432, applications 434, and processes 436 provide software logic to provide functions for system 400. In one example, memory subsystem 420 includes memory controller 422, which is a memory controller to generate and issue commands to memory 430. It will be understood that memory controller 422 could be a physical part of processor 410 or a physical part of interface 412. For example, memory controller 422 can be an integrated memory controller, integrated onto a circuit with processor 410.

While not specifically illustrated, it will be understood that system 400 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 400 includes interface 414, which can be coupled to interface 412. In one example, interface 414 represents an interface circuit, which can include stand-alone components and integrated circuitry. In one example, multiple user interface components or peripheral components, or both, couple to interface 414. Network interface 450 provides system 400 the ability to communicate with remote devices (e.g., servers or other computing devices) over one or more networks. Network interface 450 can include an Ethernet adapter, wireless interconnection components, cellular network interconnection components, USB (universal serial bus), or other wired or wireless standards-based or proprietary interfaces. Network interface 1050 can transmit data to a device that is in the same data center or rack or a remote device, which can include sending data stored in memory. Network interface 450 can receive data from a remote device, which can include storing received data into memory. Various embodiments can be used in connection with network interface 450, processor 410, and memory subsystem 420.

In one example, system 400 includes one or more input/output (I/O) interface(s) 460. I/O interface 460 can include one or more interface components through which a user interacts with system 400 (e.g., audio, alphanumeric, tactile/touch, or other interfacing). Peripheral interface 470 can include any hardware interface not specifically mentioned above. Peripherals refer generally to devices that connect dependently to system 400. A dependent connection is one where system 400 provides the software platform or hardware platform or both on which operation executes, and with which a user interacts.

In one example, system 400 includes storage subsystem 480 to store data in a nonvolatile manner. In one example, in certain system implementations, at least certain components of storage 480 can overlap with components of memory subsystem 420. Storage subsystem 480 includes storage device(s) 484, which can be or include any conventional medium for storing large amounts of data in a nonvolatile manner, such as one or more magnetic, solid state, or optical based disks, or a combination. Storage 484 holds code or instructions and data 1046 in a persistent state (i.e., the value is retained despite interruption of power to system 400). Storage 484 can be generically considered to be a "memory," although memory 430 is typically the executing or operating memory to provide instructions to processor 410. Whereas storage 484 is nonvolatile, memory 430 can include volatile memory (i.e., the value or state of the data is indeterminate if power is interrupted to system 400). In one example, storage subsystem 480 includes controller 482 to interface with storage 484. In one example controller 482 is a physical part of interface 414 or processor 410 or can include circuits or logic in both processor 410 and interface 414.

A volatile memory is memory whose state (and therefore the data stored in it) is indeterminate if power is interrupted to the device. Dynamic volatile memory can involve refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WI02 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 400. More specifically, power source typically interfaces to one or multiple power supplies in system 400 to provide power to the components of system 400. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 400 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (i.e., buses) for coupling appropriate integrated circuits (ICs) and other components mounted to the board.

Various embodiments can be used in a base station that supports communications using wired or wireless protocols (e.g., 3GPP Long Term Evolution (LTE) (4G) or 3GPP 5G), on-premises data centers, off-premises data centers, edge network elements, edge servers and switches, fog network elements, and/or hybrid data centers (e.g., data center that use virtualization, cloud and software-defined networking to deliver application workloads across physical data centers and distributed multi-cloud environments).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

Figure 5:
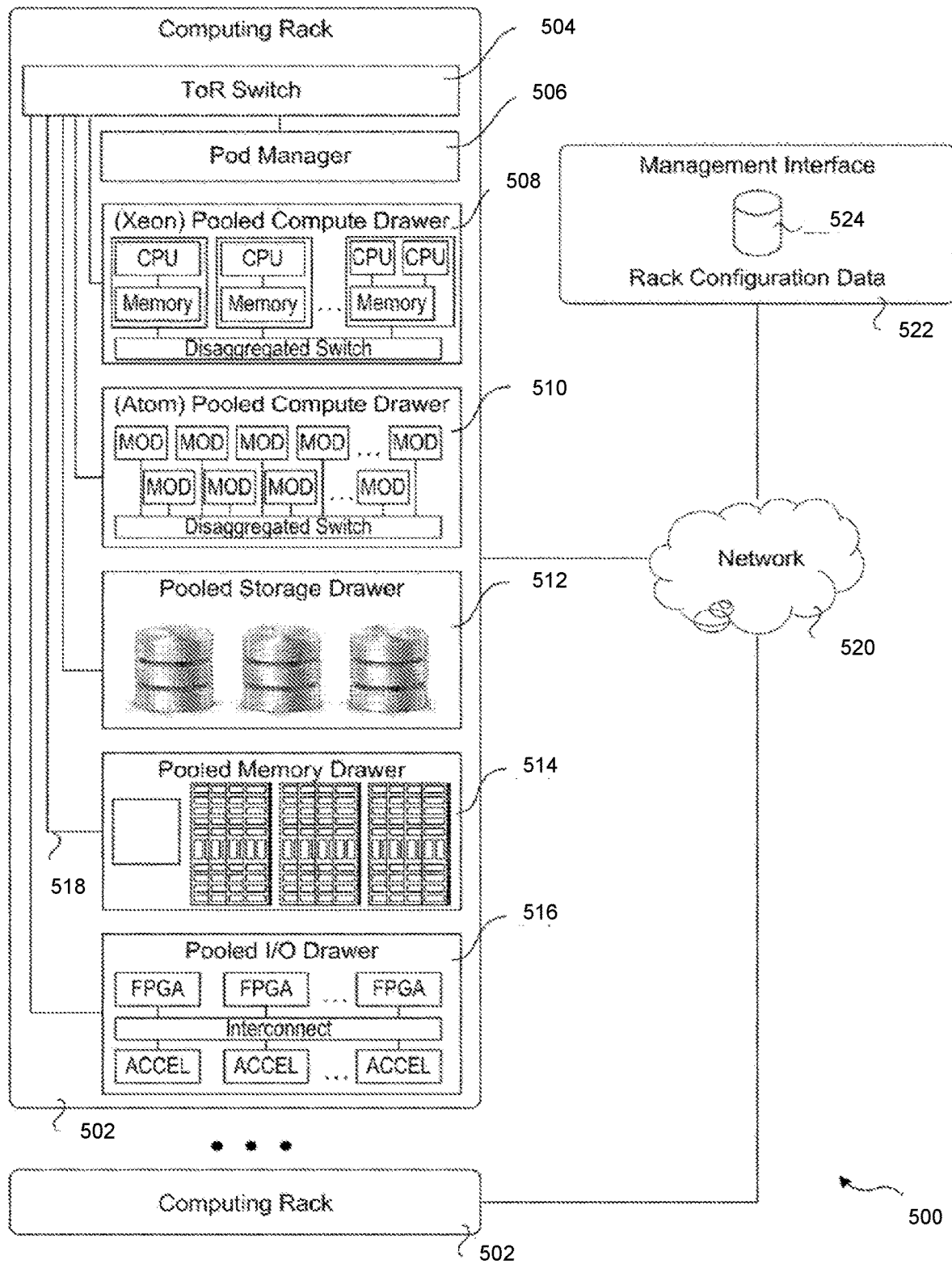
FIG. 5 depicts an example environment.

FIG. 5 depicts an environment 500 includes multiple computing racks 502, one or more including a Top of Rack (ToR) switch 504, a pod manager 506, and a plurality of pooled system drawers. Various embodiments can be used to receive and validate firmware code. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 508, and Intel® ATOM™ pooled compute drawer 510, a pooled storage drawer 512, a pooled memory drawer 514, and a pooled I/O drawer 516. Any of the pooled system drawers is connected to ToR switch 504 via a high-speed link 518, such as a 40 Gigabit/second (Gb/s) or 100 Gb/s Ethernet link or a 100+Gb/s Silicon Photonics (SiPh) optical link, or higher speeds.

Multiple of the computing racks 502 may be interconnected via their ToR switches 504 (e.g., to a pod-level switch or data center switch), as illustrated by connections to a network 520. In some embodiments, groups of computing racks 502 are managed as separate pods via pod manager(s) 506. In one embodiment, a single pod manager is used to manage all of the racks in the pod. Alternatively, distributed pod managers may be used for pod management operations.

Environment 500 further includes a management interface 522 that is used to manage various aspects of the environment. This includes managing rack configuration, with corresponding parameters stored as rack configuration data 524.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes a computer-readable medium, comprising instructions stored thereon, that if executed by one or more processors, cause the one or more processors to: change a firmware, stored in a first buffer, executed by a device, by executing an instruction that is to cause installation of a second firmware, wherein the second firmware is copied to the first buffer prior to execution of the instruction.

Example 2 includes any example, wherein change a firmware executed by a device is in response to an indication that a firmware update is available and the firmware is executed by the device during runtime or on re-boot.

Example 3 includes any example, and includes instructions stored thereon, that if executed by one or more processors, cause the one or more processors to: prior to execution of the instruction, validate the second firmware using a device root of trust.

Example 4 includes any example, wherein the second firmware is copied to the first buffer prior to execution of the instruction comprises distribution of the second firmware to one or more devices at the request of a platform root of trust.

Example 5 includes any example, wherein the instruction causes the device to execute the second firmware.

Example 6 includes any example, wherein the instruction comprises an operating system-executed write to a particular processor register and wherein the particular processor register is to cause an execution of the second firmware.

Example 7 includes any example, wherein the device comprises one or more of: a core, a network interface controller, an infrastructure processing unit (IPU), a microcontroller, a storage controller, or an accelerator.

Example 8 includes any example, and includes a method that includes: while a device executes a first firmware, executing an instruction that causes installation of a second firmware, wherein the second firmware is copied to a buffer for access by the device prior to execution of the instruction.

Example 9 includes any example, wherein executing an instruction that causes installation of a second firmware is in response to an indication that a firmware update is available.

Example 10 includes any example, and includes prior to execution of the instruction, validating the second firmware using a root of trust associated with the device.

Example 11 includes any example, and includes distributing the second firmware to one or more devices at the request of a platform root of trust.

Example 12 includes any example, wherein the instruction causes the device to execute the second firmware.

Example 13 includes any example, wherein the instruction comprises an operating system-executed write to a particular processor register and wherein the particular processor register is to cause an execution of the second firmware.

Example 14 includes any example, wherein the device comprises one or more of: a core, a network interface controller, an infrastructure processing unit (IPU), a microcontroller, a storage controller, or an accelerator.

Example 15 includes any example, and includes an apparatus comprising: a firmware update device to execute a second firmware, in place of execution of a first firmware, in response to an instruction that causes the firmware update device to execute the second firmware, wherein the second firmware is copied to a buffer prior to execution of the instruction.

Example 16 includes any example, wherein the firmware update device comprises one or more of: an Intel® Management or Manageability Engine (ME), an AMD® Platform Security Processor (PSP), an ARM® core with a TrustZone extension, or a secure enclave.

Example 17 includes any example, and includes one or more processors, wherein one or more processors are to execute the instruction that causes the firmware update device to execute the second firmware.

Example 18 includes any example, and includes a device root of trust, wherein prior to execution of the instruction, the device root of trust is to validate the second firmware.

Example 19 includes any example, and includes a platform root of trust, wherein the platform root of trust is to distribute the second firmware to one or more devices.

Example 20 includes any example, wherein the instruction comprises an operating system-executed write to a particular processor register and wherein the particular processor register is to cause an execution of the second firmware.

Example 21 includes any example, and includes a device coupled to the firmware update device, wherein the device comprises one or more of: a core, a network interface controller, an infrastructure processing unit (IPU), a microcontroller, a storage controller, or an accelerator.

Example 22 includes any example, and includes: a server, rack, or data center communicatively coupled to the firmware update device, wherein the server, rack, or data center comprises the device that is to executed the second firmware.

What is claimed is:

1. At least one non-transitory computer-readable medium, comprising instructions stored thereon, that is executed by one or more processors, cause the one or more processors to: change a firmware, stored in a first buffer, executed by a device, by executing an instruction that is to cause installation of a second firmware verified by a platform root of trust (RoT) and a device RoT, wherein:
the platform RoT is to perform a first verification of the second firmware,
based on verification of the second firmware by the platform RoT, copy the second firmware to the first buffer, and
the device RoT is to perform a second verification of the second firmware.

2. The computer-readable medium of claim 1, wherein change the firmware executed by the device is in response to an indication that the firmware update is available and the firmware is executed by the device during runtime or on re-boot.

3. The computer-readable medium of claim 1, wherein the execution of the instruction causes the device to execute the second firmware.

4. The computer-readable medium of claim 1, wherein the instruction comprises an operating system-executed write to a particular processor register and wherein the write to the particular processor register is to cause an execution of the second firmware.

5. The computer-readable medium of claim 1, wherein the device comprises one or more of: a core, a network interface controller, an infrastructure processing unit (IPU), a microcontroller, a storage controller, or an accelerator.

6. A method comprising:
while a device executes a first firmware, executing an instruction that causes installation of a second firmware verified by a platform root of trust (RoT) and a device RoT, wherein:
the platform RoT performs a first verification of the second firmware,
based on the first verification of the second firmware, copying the second firmware to a first buffer, and
the device RoT performs a second verification of the second firmware.

7. The method of claim 6, wherein the executing the instruction that causes installation of the second firmware is in response to an indication that a firmware update is available.

8. The method of claim 6, comprising:
distributing the second firmware to one or more devices at a request of the platform RoT.

9. The method of claim 6, wherein the instruction causes the device to execute the second firmware.

10. The method of claim 6, wherein the instruction comprises an operating system-executed write to a particular processor register and wherein the write to the particular processor register is to cause an execution of the second firmware.

11. The method of claim 6, wherein the device comprises one or more of: a core, a network interface controller, an infrastructure processing unit (IPU), a microcontroller, a storage controller, or an accelerator.

12. An apparatus comprising:
at least one processor and
circuitry to cause a device to execute a second firmware verified by a platform root of trust (RoT) and a device RoT, in place of execution of a first firmware, in response to execution of an instruction, wherein:
the platform RoT is to perform a first verification of the second firmware, based on verification of the second firmware by the platform RoT, copy the second firmware to a first buffer, and the device RoT is to perform a second verification of the second firmware.

13. The apparatus of claim 12, wherein the circuitry comprises one or more of:

an Intel® Management or Manageability Engine (ME), an AMD® Platform Security Processor (PSP), an ARM® core with a TrustZone extension, or a secure enclave.

14. The apparatus of claim 12, comprising one or more processors, wherein one or more processors are to execute the instruction that causes a firmware update device to cause the device to execute the second firmware.

15. The apparatus of claim 12, comprising:

the device RoT, wherein prior to execution of the instruction, the device RoT is to validate the second firmware.

16. The apparatus of claim 12, comprising:

the platform RoT, wherein the platform RoT is to distribute the second firmware to one or more devices.

17. The apparatus of claim 12, wherein the instruction comprises an operating system-executed write to a particular processor register and wherein the write to the particular processor register is to cause an execution of the second firmware.

18. The apparatus of claim 12, comprising the device, wherein the device comprises one or more of: a core, a network interface controller, an infrastructure processing unit (IPU), a microcontroller, a storage controller, or an accelerator.

19. The apparatus of claim 12, comprising: a server, rack, or data center communicatively coupled to the firmware update device, wherein the server, rack, or data center comprises the device that is to execute the second firmware.

20. The apparatus of claim 12, comprising: a server, rack, or data center communicatively coupled to a firmware update device, wherein the server, rack, or data center comprises the device that is to execute the second firmware.

* * * * *